United States Patent Office 3,097,066
Patented July 9, 1963

3,097,066
PROCESS FOR THE PRODUCTION OF BORON AND ALUMINIUM COMPOUNDS CONTAINING HYDROCARBON RADICALS AND/OR HYDROGEN
Roland Köster, Günter Bruno, and Hans-Herbert Lehmkuhl, Mulheim (Ruhr), Germany, assignors to Studiengesellschaft Kohle m.b.H., Mulheim (Ruhr), Germany
No Drawing. Filed Feb. 20, 1957, Ser. No. 641,246
Claims priority, application Germany Feb. 25, 1956
16 Claims. (Cl. 23—204)

This invention relates to a process for the production of boron and aluminium compounds containing hydrocarbon radicals and/or hydrogen.

It has been found in accordance with the invention that compounds of the general formulae $$R_2BH, RBH_2 \text{ and } R_2AlH$$

are obtained if boron or aluminium compounds of the general formula $$R_3B \text{ or } R_3Al$$

wherein R is a hydrocarbon radical, are heated with hydrogen under pressure to temperatures between 120 and 160° C.

The following reactions then take place:

$$R_3Al+H_2=R_2AlH+HR$$
$$R_3B+H_2=R_2BH+HR$$
$$R_3B+2H_2=RBH_2+2HR$$

As regards the last two of the aforementioned reactions, it is of course also possible first of all to produce $R_2BH$ and then to reduce the latter in a separate reaction to form $RBH_2$. Generally speaking, however, when boron trialkyls are reduced (and here and in the subsequent description only alkyls will for convenience be referred to, though it should be understood that the statements made of the alkyls are also true generally of the other hydrocarbon compounds), mixtures of dialkyl boron monohydrides and mono-alkyl borohydrides are also obtained. These mixtures consist entirely or up to a certain fraction of compounds of the general formula $R_3B_2H_3$ and perhaps the monohydride and dihydride in excess.

The mixed association to form compounds of the formula $R_3B_2H_3$ just referred to is in accordance with experiences of Schlesinger (H. I. Schlesinger, A. O. Walker: J. Am. Chem. Soc., 57, 621/5 (1935), H. I. Schlesinger, N.W. Flodin, A.B. Burg: J. Am. Chem. Soc., 61, 1078/83 (1939)).

Such alkyl boron hydrides obtainable from boron trialkyls by reduction can be converted into unitary dialkyl boron hydrides if they are after-treated with the correct amount of a boron trialkyl, (cf. H. I. Schlesinger, A. O. Walker: J. Am. Chem. Soc., 57, 621/5 (1935), H. I. Schlesinger, C. Horvitz, A. B. Burg: J. Am. Chem. Soc., 58, 407/9 (1936)).

On the other hand, unitary mono-alkyl boron dihydrides can also be produced from these mixtures if the mixtures are after-treated with the correct amount of boron hydride.

The hydrogenation of aluminium trialkyls in principle takes place in analogous manner to the reaction just described in connection with the boron alkyls.

If the reaction conditions are somewhat intensified by lengthening the reaction time or raising the reaction temperature, it is clearly $RAlH_2$ which is initially formed. These aluminium compounds are however to all appearances unstable. They initially experience disproportionation in accordance with the equation:

$$2RAlH_2=R_2AlH+AlH_3$$

whereupon the aluminium hydride, which is unstable at a high temperature, then splits up into hydrogen and aluminium. Consequently, energetic treatment of aluminium alkyls with hydrogen under pressure yields only aluminium and the corresponding hydrocarbons with the formula RH.

With the boron compounds, it is in principle possible by suitable intensification of the reaction conditions to obtain up to the boron hydride $B_2H_6$. It is only known of boron hydride that it changes hydrocarbons in a complicated and obscure manner (cf. D. T. Hurd: J. Am. Chem. Soc., 70, 2153/5 (1948)), so that then the course of the reaction as a whole is non-uniform and uninteresting.

The dialkyl boron monohydrides and the mono-alkyl boron dihydrides do not have this reactivity with respect to the hydrocarbons which are split off. Consequently, the hydrogenation of the boron alkyls in accordance with the invention up to the stage of the aforementioned intermediate products to form boron alkyls and boron hydrides can be carried out very smoothly and without further complications.

The process of the invention obviates various disadvantages of the former methods of obtaining the compounds referred to. The reaction:

$$AlR_3+H_2=AlHR_2+HR \text{ (R is an alkyl radical)}$$

in accordance with the invention allows large amounts of the dialkyl aluminium hydrides to be directly obtained in a pure form by simple hydrogenation from the corresponding aluminium trialkyls if these latter are reacted with hydrogen at pressures of from 50 to 300 atm. gauge or even higher and at temperatures from 120–160° C. The best process so far proposed operates under similar conditions in the presence of metallic aluminium. It proceeds in accordance with the equation:

$$2AlR_3+Al+1\frac{1}{2}H_2=3AlHR_2$$

When this method is used, 3 mols of the dialkyl aluminium hydride are obtained from 2 mols of the aluminium trialkyl and also no alkyl group is lost. However, the process requires a larger expenditure than that in accordance with the present invention for the aluminium must be activated in a special way.

Consequently, the process of the invention is preferred when it is desired to produce the dialkyl aluminium hydride in the simplest possible way from an available aluminium trialkyl.

When it is desired to produce boron alkyl hydrides, there is no possibility of a reaction taking place in accordance with the equation $$2BR_3+B+1\frac{1}{2}H_2=3BHR_2$$

so that the advantage of the process of the invention is readily apparent in this connection.

A substantially quantitative reaction to form $B_2H_6$ can be obtained if care is taken that the temperature in the process of the invention is maintained during the reaction at a value between 140 and 160° C. and the heating is carried out for such a time and with such an amount of hydrogen that the alkyl radicals on the boron are completely dehydrogenated. It is surprising that it is possible for such a process to be carried out, since it is known that diborane is likely to undergo a complicated change on being heated together with saturated hydrocarbons. The formation of such saturated hydrocarbons as byproducts is unavoidable in the process of the invention, so that such complicated changes might per se have been expected.

In principle, all boron trialkyls are suitable for use as starting materials in the reaction. With boron trialkyls of the general formula $B(C_nH_{2n+1})_3$ the reaction nevertheless proceeds very slowly when $n=1$ or 2, so that the reaction is uneconomic and consequently of no interest for practical purposes. When $n$ has a value of 3 or higher, the alkyl radicals attached to the boron atom split off substantially more readily during hydrogenation. In addition, the use of boron trialkyls having longer hydrocarbon radicals produces the additional advantage that the corresponding compounds, i.e. $B_2H_6$ and the volatile hydrocarbon formed, can more easily be separated from one another owing to the greater difference in boiling points.

The yields obtained by the process of the invention are practically quantitative. Since the hydrocarbons admixed with the $B_2H_6$ frequently do not impair subsequent reactions, it is often not necessary to effect separation of the final products. Frequently, the saturated hydrocarbons are even desirable diluents for subsequent reactions.

Suitable starting materials when this method is used are boron compounds with saturated alkyl radicals having straight or branched chains. Especially suitable starting materials are boron trialkyls, since these can today be produced very easily from the corresponding aluminium trialkyls.

When this method in accordance with the invention is used, no secondary reactions occur, as is shown by the equation $$2BR_3 + 6H_2 = B_2H_6 + 6HR$$

The hydrocarbons formed are frequently desirable carrier compounds.

As compared with the state of the art, another substantial advantage of the process of the invention is that no metal hydrides are necessary for the reaction, one result of this being that it is not necessary to work in suspension, a procedure which is frequently very tedious.

The process of the invention can be carried out with or without an inert solvent, for example a saturated aliphatic or aromatic hydrocarbon. Dilution by means of a solvent is always to be recommended when the compound introduced or formed is a solid or is highly viscous (for example dimethyl aluminium hydride).

The use of ethers as solvents or the use of aluminium trialkyl etherates for the process of the invention does not produce the required compounds of the $AlHR_2$ type, since alkoxy aluminium dialkyls are formed by a concurrent splitting up of the ether, these dialkyls no longer being available for the further reaction with hydrogen. With the boron compounds on the other hand, ethers can be used as solvents.

The following examples further illustrate the invention.

*Example 1*

137 g. (1.4 mols) = 198 cc. of boron triethyl are placed in a nitrogen atmosphere in a 500 cc. steel autoclave and hydrogen is forced in at room temperature to give a pressure of 300 atm. gauge. The autoclave is heated to 140–160° C. while shaking. The pressure drops and becomes constant after 24 hours (160 atm. gauge after cooling to room temperature). Thereafter any hydrogen unused is discharged together with the ethane formed (a total of 56 g.) and 80 g. of crystal-clear liquid are removed from the autoclave. The composition of this liquid substance, which has a very unpleasant odour, corresponds substantially to that of the compound

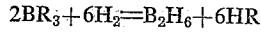

as shown from the decomposition of a sample with water. From a weighed portion amounting to 156.7 mg., 94.5 standard ccs. of hydrogen are evolved with water.

By mixing 77.5 g. (0.693 mol) of the ethylated diborane thus obtained with 68.8 g. (0.703 mol) of boron triethyl the compound $BH(C_2H_5)_2$ is obtained in pure form. It boils at a temperature of 109–111° C. at normal pressure and yields the theoretical amount of hydrogen upon decomposition with water; boron triethyl boils at 95° C.

*Example 2*

26 g. (0.1 mol) of boron tricyclohexyl (M.P.=116° C.) are dissolved in 100 cc. of hexane and introduced under a nitrogen atmosphere into a 200 cc. iron autoclave. After hydrogen has been introduced to give a pressure of 200 atm. gauge, the autoclave is heated to 150–160° C. while shaking. The reaction is discontinued after about 10 hours, and the excess hydrogen is blown off and the solution removed. This solution contains a compound with the composition $BH(C_6H_{11})_2$, as shown by the hydrogen obtained by decomposition with water.

*Example 3*

70 g. (0.5 mol) of boron tri-n-propyl are introduced under nitrogen into a 200 cc. autoclave, hydrogen is forced in to give a pressure of 300 atm. gauge and the mixture is subjected to a hydrogenating cleavage reaction for about 15 hours. 45 g. (0.46 mol) of the compound $BH(C_3H_7)_2 \cdot BH(C_3H_7)_2$ are obtained after blowing off the excess hydrogen and the propane which is formed. Decomposition of the compound with water yields the corresponding amount of hydrogen.

*Example 4*

456 g. (=4 mols) of aluminium triethyl are introduced under nitrogen into a 1-litre iron autoclave. After hydrogen has been forced in to give a pressure of 300 atm. gauge, the autoclave is heated to 140–150° C. and shaken for 20–24 hours. After this time the pressure has dropped to a constant value (about 120-atm. gauge at room temperature); the excess hydrogen is mixed with the ethane which is formed and thereafter the liquid contents are removed under nitrogen. This crude product contains 29.5% of aluminium. The pure diethyl aluminium hydride is readily obtained by distillation carried out at reduced pressure with a small column; after about 20% of the amount of liquid has been distilled off at a pressure of 1–2 mm. and a temperature of approximately 50° C., the diethyl aluminium hydride is obtained as a residue in the form of a crystal-clear readily mobile liquid with an aluminium content of 31.2% (calculated value 31.4%).

*Example 5*

108 g. (1.5 mols) of aluminium trimethyl, which are dissolved in 50 cc. of hexane, are placed under nitrogen in a 200 cc. autoclave. Hydrogen is forced in to give a pressure of 300 atm. gauge in the cold state. The contents of the autoclave are thereafter heated to 150–160° C. while shaking and reacted at this temperature for about 20 hours. After cooling and blowing off the gases (unmodified hydrogen and the methane which is formed), the liquid contents of the autoclave are discharged. After the solvent has been distilled off, there is obtained a mixture of approximately 50% of aluminium trimethyl and 50% of aluminium dimethyl hydride, which is obtained as a highly viscous colourless liquid with an aluminium content of 46.4% after the unmodified aluminium trimethyl has been distilled off at reduced pressure (B.P.$_{12 \text{ mm.}}$=20° C.).

*Example 6*

70 g. (0.25 mol) of aluminium tri-n-hexyl are reacted in a 250 cc. autoclave with hydrogen at a pressure of 250 atm. gauge at 140–150° C. After approximately 20 hours, the pressure has fallen to a constant value (about 40 atm. gauge) at room temperature. After blowing off the excess hydrogen and discharging the liquid under nitrogen, 48 g. of aluminium di-n-hexyl hydride with an aluminium content of 13.1% are obtained after the hexane which is formed has been distilled off in water jet vacuum.

*Example 7*

An experiment corresponding to that described in Examples 1–3 but using aluminium tridodecyl leads to aluminium didodecyl hydride, which is obtained as a solid compound (M.P.=30–35° C.) after the dodecane which is formed has been distilled off. The aluminium content of the compound which is obtained is 7.0%, and in addition the corresponding number of ccs. of hydrogen are obtained by decomposition with water.

Example 8

71.4 g. (0.392 mol) of boron triisobutyl are introduced under nitrogen into a 200 cc. autoclave, hydrogen is forced in to give a pressure of 10 atm. and the autoclave is heated to approximately 200° C. The pressure falls, over a period of 15 hours, to approximately 3 atm. at room temperature. 2 g. of isobutane are blown off and hydrogen again introduced to give a pressure of 10 atm. After this operation has been repeated 9 times, 48 g. of a colourless liquid (tetra-isobutyl diborane) are obtained after a total of 22 g. of isobutane has been blown off. The compound can be distilled without decomposition at reduced pressure (B.P.$_{13/14\,mm.}$=84–86° C.).

Example 9

A solution of 10 g. of boron triphenyl in 100 cc. of benzene is placed in a nitrogen atmosphere in a 200 cc. autoclave, hydrogen is forced in to give a pressure of 50 atm. and the autoclave is heated to 160° C. The pressure drops over a period of 24 hours to a value of 20 atm. at room temperature. After the gas has been blown off, there is obtained a clear solution of monophenyl boron dihydride (as ascertained from the gas value obtained upon decomposing a sample with water), from which diborane is liberated by heating at atmospheric pressure. The monophenyl borohydride can be obtained as a solid compound (M.P.=84° C.) by adding hexane.

Example 10

182 g. (1.0 mol) (250 cc.) of boron tri-n-butyl are reacted for 12 hours in a 2-litre roller-type autoclave at a temperature between about 145 and 150° C. (maximum temperature 160° C.) with 260 atm. of hydrogen (this is the initial pressure at room temperature); thereafter the pressure has a constant value of 190 atm. at room temperature.

After the autoclave has been cooled, the excess hydrogen is blown off together with the diborane and n-butane which are formed. All the n-butane (170 g.), together with approximately 4% of the diborane which is formed, are thereafter obtained in a trap which is directly connected to the autoclave and which is cooled to −80° C. The main quantity of the diborane which is blown off is condensed in a trap cooled with liquid air. In the experiment referred to, it is possible for a total of 0.95 mol of $B_2H_6$ (95% yield) to be isolated in this way. Qualitative analysis (mass spectrogram) and also quantitative analysis (pressure measurements in conjunction with the mass spectrogram) clearly show the product to be diborane $B_2H_6$.

Example 11

27 g. (0.15 mol) of boron triisobutyl are reacted in a 200 cc. autoclave at 145–150° C. for 12 hours with hydrogen under pressure, as in Example 1. Thereafter the pressure remains constant. After cooling, diborane $B_2H_6$ (0.13 mol, corresponding to 86.5% of the theoretical) can be recovered as well as isobutane, as in Example 1. When the diborane is used for a subsequent reaction, it is generally also possible to use $B_2H_6$ diluted with isobutane. After blowing off, the autoclave is completely empty, so that the next reaction can be carried out without further cleaning of the reaction vessel.

What we claim is:

1. Process for the production of organic aluminum monohydrides which comprises heating an organic aluminum compound having the general formula $R_3Al$ in which R is a member of the group consisting of alkyl, lower cycloalkyl and phenyl radicals, with hydrogen at a pressure above about 50 atmospheres gauge and recovering the organic aluminum monohydride formed.

2. Process according to claim 1 in which said pressure is in excess of about 300 atmospheres gauge.

3. Process according to claim 1 in which said pressure is between 50 and 300 atmospheres gauge.

4. A method of preparing alkyldiboranes that comprises reacting hydrogen and a tri(lower alkyl) borane at a pressure above about 50 atm. and a temperature between 120 and 200° C. and recovering the alkyldiborane formed.

5. Process for the production of hydrides which comprises reacting a compound selected from the group consisting of boron compounds of the general formula $R_3B$ and aluminum compounds of the general formula $R_3Al$ in which R is a member selected from the group consisting of alkyl, lower cycloalkyl and phenyl radicals with hydrogen at a temperature between about 120 and 200 degrees C. and under a pressure in excess of atmospheric and recovering the hydride compound formed.

6. Process according to claim 5 in which at least one of said first-mentioned group members and said recovered hydride compound is a solid compound and in which said contacting is effected in the presence of an inert solvent.

7. Process according to claim 5 in which at least one of said first-mentioned group members and said recovered hydride compound is a highly viscous compound, and in which said reacting is effected in the presence of an inert solvent.

8. Process according to claim 5 in which said first-mentioned group member is a boron compound, in which said reacting is effected at a temperature between about 140 and 160 degrees C. and in which said recovered hydride compound is a boron hydride compound.

9. Process according to claim 5 in which said reacting is effected in the presence of an inert solvent.

10. Process according to claim 5 in which said recovered hydride compound is a solid compound and in which said reacting is effected in the presence of an inert solvent.

11. Process according to claim 5 in which said recovered hydride compound is a highly viscous compound and in which said reacting is effected in the presence of an inert solvent.

12. Process according to claim 5 in which said reacting is effected in the presence of an inert solvent comprising an aromatic hydrocarbon.

13. Process according to claim 5 in which said first-mentioned group member is a boron compound and in which said reacting is effected in the presence of an inert solvent comprising an ether.

14. Process according to claim 5 in which said reacting is effected at a temperature of between about 120 and 160 degrees C.

15. Process for the production of boron hydrides which comprises reacting a boron trialkyl with hydrogen at a temperature between about 120 and 200 degrees C. and under a pressure in excess of atmospheric and recovering the boron hydride compound formed.

16. Process for the production of boron hydride which comprises reacting a boron trialkyl, the alkyl radical of which contains at least three carbon atoms with hydrogen at a temperature between about 120 and 200 degrees C., under a pressure in excess of atmospheric and recovering the boron hydride compound formed.

References Cited in the file of this patent

Patterson: Chemical and Engineering News, vol. 34, page 560 (1956). (Copy in Scientific Library.)

Stock: "Hydrides of Boron and Silicon," Cornell Univ. Press, Ithaca, New York (1933), pages 100–1. (Copy in Div. 46.)

Bonitz: Chem. Abs., vol. 50, pages 164–5 (1956).

Yeddanapanalli et al.: Chemical Physics Journal, vol. 14, pages 1 to 7 (1946). (Copy in Sci. Library.)